(12) United States Patent
Sommer et al.

(10) Patent No.: US 10,807,143 B2
(45) Date of Patent: Oct. 20, 2020

(54) TOOLING FOR FORMING NACELLE COMPONENTS

(71) Applicant: ROHR, INC., Chula Vista, CA (US)

(72) Inventors: Thomas Sommer, San Diego, CA (US); William McLennan, Austin, TX (US)

(73) Assignee: ROHR, INC, Chula Vista, CA (US)

( * ) Notice: Subject to any disclaimer, the term of this patent is extended or adjusted under 35 U.S.C. 154(b) by 301 days.

(21) Appl. No.: 15/943,225

(22) Filed: Apr. 2, 2018

(65) Prior Publication Data

US 2019/0299269 A1 Oct. 3, 2019

(51) Int. Cl.
| | |
|---|---|
| *B21D 26/055* | (2011.01) |
| *B21D 26/059* | (2011.01) |
| *B21D 35/00* | (2006.01) |
| *B21D 26/031* | (2011.01) |
| *B21D 26/021* | (2011.01) |
| *B21D 53/92* | (2006.01) |
| *B64D 29/00* | (2006.01) |
| *B21D 26/027* | (2011.01) |
| *B21D 26/029* | (2011.01) |
| *B64F 5/10* | (2017.01) |

(52) U.S. Cl.
CPC ......... *B21D 26/055* (2013.01); *B21D 26/021* (2013.01); *B21D 26/031* (2013.01); *B21D 26/059* (2013.01); *B21D 35/003* (2013.01); *B21D 53/92* (2013.01); *B64D 29/00* (2013.01)

(58) Field of Classification Search
CPC .. B21D 26/025; B21D 26/027; B21D 26/031; B21D 26/041; B21D 26/047; B21D 26/055; B21D 26/059; B21D 26/021; B21D 26/029; B21D 35/003; B21D 53/92; B21D 53/78; B64D 29/00; B64F 5/10; B23P 2700/01; Y10T 29/49622; Y10T 29/49805
USPC ............................................... 72/60, 61, 709
See application file for complete search history.

(56) References Cited

U.S. PATENT DOCUMENTS

| | | | |
|---|---|---|---|
| 3,649,375 A | * | 3/1972 | Venkatesan .......... B21D 26/055 148/522 |
| 4,429,824 A | | 2/1984 | Woodward |
| | | | (Continued) |

FOREIGN PATENT DOCUMENTS

| | | |
|---|---|---|
| EP | 0229954 | 7/1987 |
| EP | 2774699 | 9/2014 |
| | (Continued) | |

OTHER PUBLICATIONS

European Patent Office, European Search Report dated Jul. 4, 2019 in Application No. 19166480.4.

*Primary Examiner* — Adam J Eiseman
*Assistant Examiner* — Mohammed S. Alawadi
(74) *Attorney, Agent, or Firm* — Snell & Wilmer L.L.P.

(57) ABSTRACT

An assembly for forming multiple nacelle components is disclosed. In accordance with various embodiments, the assembly includes a plurality of dies arranged about a central axis. A first one of the plurality of dies has a first wall and a first cavity extending through the first wall and a second one of the plurality of dies has a second wall and a second cavity extending through the second wall. The first wall and the second wall are configured to sandwich a pair of metal blanks there between. In various embodiments, a structural ring is configured to surround the plurality of dies.

11 Claims, 6 Drawing Sheets

(56) References Cited

U.S. PATENT DOCUMENTS

| | | | | |
|---|---|---|---|---|
| 4,827,747 | A | * | 5/1989 | Okada .................... B21D 15/10 72/370.05 |
| 5,016,805 | A | * | 5/1991 | Cadwell ............... B21D 26/055 228/118 |
| 5,143,276 | A | | 9/1992 | Mansbridge et al. |
| 5,277,045 | A | * | 1/1994 | Mahoney ............ B21D 26/055 72/60 |
| 5,419,791 | A | * | 5/1995 | Folmer ................ B21D 26/047 148/585 |
| 5,729,901 | A | | 3/1998 | Fowler et al. |
| 5,823,034 | A | * | 10/1998 | Nelepovitz .......... B21D 26/055 72/60 |
| 6,006,568 | A | * | 12/1999 | Bihrer .................. B21D 26/033 29/421.1 |
| 6,386,009 | B1 | * | 5/2002 | Ni .......................... B21C 37/294 29/421.1 |
| 8,329,312 | B2 | | 12/2012 | Sanders et al. |
| 2003/0000270 | A1 | * | 1/2003 | Carolan ............... B21D 26/031 72/62 |
| 2003/0177801 | A1 | * | 9/2003 | Park ....................... B21D 37/16 72/60 |
| 2009/0199946 | A1 | * | 8/2009 | Sommer ............. B23K 20/023 156/60 |

FOREIGN PATENT DOCUMENTS

| | | | | |
|---|---|---|---|---|
| GB | 1056343 | A | * 1/1967 | ............. B21D 26/08 |
| JP | S63207422 | | 8/1988 | |

* cited by examiner

TOOLING FOR FORMING NACELLE COMPONENTS

FIELD

The present disclosure relates to forming metal parts while in a superplastic state and, more particularly, to a method and apparatus for simultaneously forming multiple nacelle components, such as multiple forward bulkhead segments for gas turbine engine nacelle inlets.

BACKGROUND

Various metals, such as titanium alloys, as well as various metal alloys, exhibit superplasticity within limited temperature ranges and strain rates. Superplasticity refers to the ability of a material to develop unusually high tensile elongations with a reduced tendency toward necking—e.g., a reduction in localized deformation where large amounts of strain occur disproportionately in small, localized regions of material. Thus, while in a superplastic state, the metal or metal alloy exhibits low resistance to deformation and may be elongated with controlled thinning using a process referred to as superplastic forming. Superplastic forming (SPF) permits a sheet of such metal to be readily formed against dies to achieve desired shapes while maintaining a substantially uniform thickness in the finished part without any weak points. Vacuum superplastic forming (VSPF) is similar to SPF, except the forming process is carried out in a vacuum, using an inert gas to deform a metal workpiece while in a superplastic state.

SUMMARY

An apparatus for forming multiple nacelle components is disclosed. In various embodiments, the assembly comprises a plurality of dies arranged about a central axis. A first one of the plurality of dies has a first wall and a first cavity extending through the first wall and a second one of the plurality of dies has a second wall and a second cavity extending through the second wall. The first wall and the second wall are configured to sandwich a pair of metal blanks there between.

In various embodiments, the first one of the plurality of dies is a radially outer die configured for arrangement within an outer circular pattern and the first wall is a radially inward facing wall. In various embodiments, the second one of the plurality of dies is a radially inner die configured for arrangement within an inner circular pattern and the second wall is a radially outward facing wall.

In various embodiments, the plurality of dies comprises a plurality of radially outer dies configured for arrangement within an outer circular pattern. In various embodiments, the plurality of dies comprises a plurality of radially inner dies configured for arrangement within an inner circular pattern. In various embodiments, the first cavity is a radially inward facing cavity and the second cavity is a radially outward facing cavity.

In various embodiments, each of the plurality of radially inner dies includes a radially inner surface configured to define a lengthwise void along the central axis. In various embodiments, each of the plurality of radially outer dies includes a radially outer surface configured to receive a structural ring to surround the plurality of dies. In various embodiments, the structural ring is a cylindrical sleeve. In various embodiments, the assembly further comprises a base member and the cylindrical sleeve extends from the base member to an upper portion of the assembly.

In various embodiments, the first one of the plurality of dies is a first radial die configured for arrangement within a circular pattern and the first wall is a first circumferentially facing wall. In various embodiments, the second one of the plurality of dies is a second radial die configured for arrangement within the circular pattern and the second wall is a second circumferentially facing wall. In various embodiments, the first radial die includes a first circumferentially facing cavity within the first circumferentially facing wall and the second radial die includes a second circumferentially facing cavity within the second circumferentially facing wall.

A method for forming multiple nacelle components is disclosed. In various embodiments, the method includes providing a plurality of dies arranged about a central axis, whereby a first one of the plurality of dies has a first wall and a first cavity extending through the first wall and a second one of the plurality of dies has a second wall and a second cavity extending through the second wall, the first wall and the second wall being configured to sandwich a pair of metal blanks there between. In various embodiments, the method further includes positioning the pair of metal blanks between the first wall and the second wall; heating the plurality of dies to a temperature sufficient to achieve a superplastic state within the pair of metal blanks; and pressurizing an interior section of the pair of metal blanks, thereby urging a first portion of the pair of metal blanks into the first cavity and a second portion of the pair of metal blanks into the second cavity.

In various embodiments, the first one of the plurality of dies is a radially outer die configured for arrangement within an outer circular pattern and the first wall is a radially inward facing wall. In various embodiments, the second one of the plurality of dies is a radially inner die configured for arrangement within an inner circular pattern and the second wall is a radially outward facing wall. In various embodiments, the plurality of dies comprises a plurality of radially outer dies configured for arrangement within an outer circular pattern and a plurality of radially inner dies configured for arrangement within an inner circular pattern.

In various embodiments, the first one of the plurality of dies is a first radial die configured for arrangement within a circular pattern and the first wall is a first circumferentially facing wall. In various embodiments, the second one of the plurality of dies is a second radial die configured for arrangement within the circular pattern and the second wall is a second circumferentially facing wall. In various embodiments, the first radial die includes a first circumferentially facing cavity within the first circumferentially facing wall and the second radial die includes a second circumferentially facing cavity within the second circumferentially facing wall.

An assembly for forming multiple forward bulkhead segments is disclosed. In various embodiments, the assembly includes a plurality of dies arranged about a central axis. A first one of the plurality of dies has a first wall and a first cavity shaped as a first forward bulkhead segment extending through the first wall and a second one of the plurality of dies has a second wall and a second cavity shaped as a second forward bulkhead segment extending through the second wall. The first wall and the second wall are configured to sandwich a pair of metal blanks there between. In various embodiments, the assembly includes a base member and a structural ring configured to surround the plurality of dies and extend from the base member to an upper portion of the assembly.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
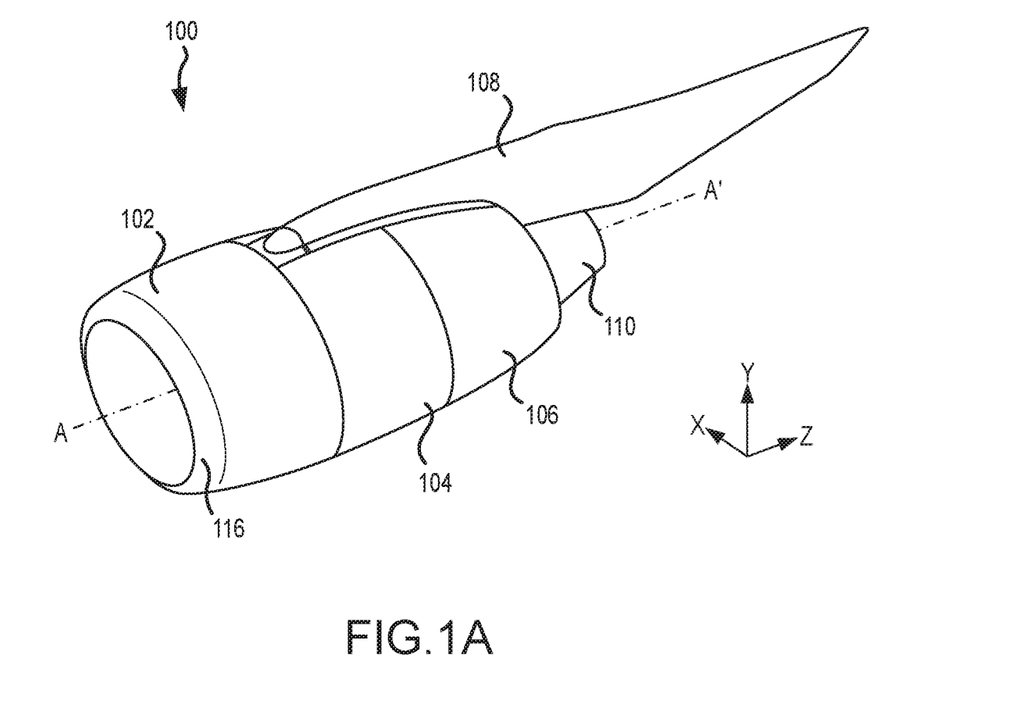
FIGS. 1A and 1B illustrate, respectively, a perspective view of a gas turbine engine nacelle and a partial perspective view of a forward bulkhead positioned within a noselip portion of the gas turbine engine nacelle, in accordance with various embodiments.
Figure 1B:
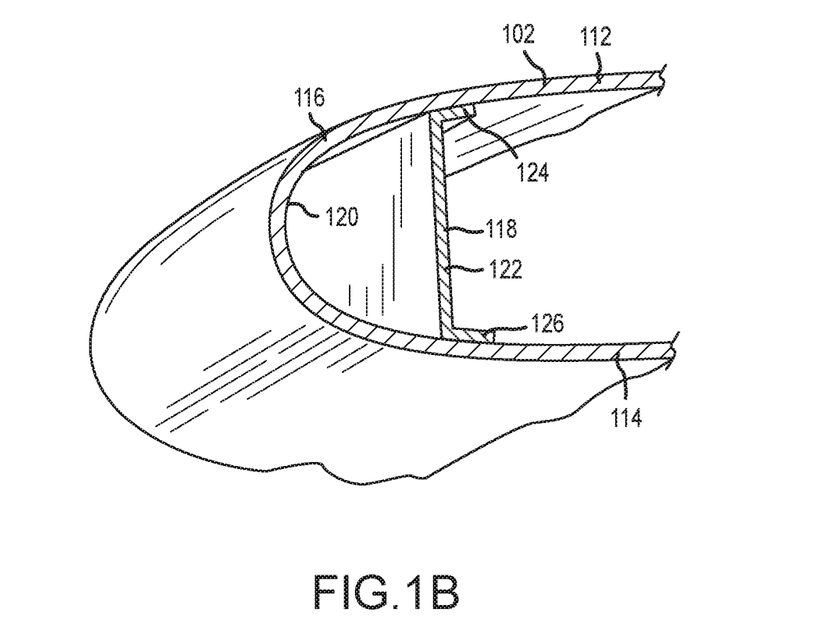

With reference to FIGS. 1A and 1B, a nacelle 100 for a gas turbine engine is illustrated according to various embodiments. The nacelle 100 may be suitable for an aircraft and comprise an inlet 102, a fan cowl 104 and a thrust reverser 106. The fan cowl 104 may comprise two halves pivotally mounted to a pylon 108 via one or more hinges. In this regard, the fan cowl 104 may comprise a first fan cowl (also referred to as a right-hand (RH) fan cowl) and a second fan cowl (also referred to as a left-hand (LH) fan cowl). The nacelle 100 may also define a centerline A-A'. In various embodiments, an exhaust nozzle 110 may extend from a turbine engine mounted within the nacelle 100. The nacelle 100 may be coupled to the pylon 108, which is used to mount the nacelle 100 to an aircraft wing or aircraft body.

In various embodiments, the inlet 102 includes an outer barrel 112, an inner barrel 114 and a noselip 116 that connects the outer barrel 112 to the inner barrel 114 and provides a leading edge surface to the inlet 102. In various embodiments, the nacelle 100 further comprises one or more bulkheads, including a forward bulkhead 118, extending circumferentially or near-circumferentially about an interior portion 120 of the noselip 116. The forward bulkhead 118 may comprise a central member 122 and an outer side member 124 and an inner side member 126. As illustrated in FIG. 1B, the central member 122 extends between the outer barrel 112 and the inner barrel 114 and is connected to the outer barrel by the outer side member 124 and to the inner barrel by the inner side member 126. As described in further detail below, in various embodiments, the forward bulkhead 118, including the central member 122, the outer side member 124 and the inner side member 126, may be fabricated by a superplastic forming (SPF) process and, more particularly, by a vacuum superplastic forming (VSPF) process.

Figure 2A:
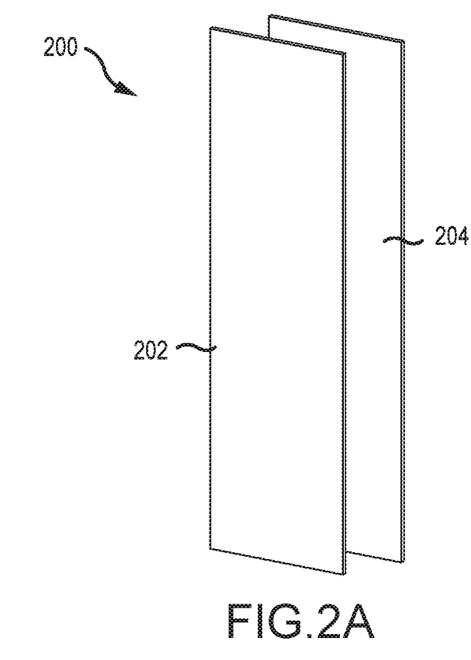
FIGS. 2A, 2B, 2C and 2D illustrate a series of steps used to superplastically deform a pair of metal blanks into a pair of forward bulkhead segments, in accordance with various embodiments.
Figure 2B:
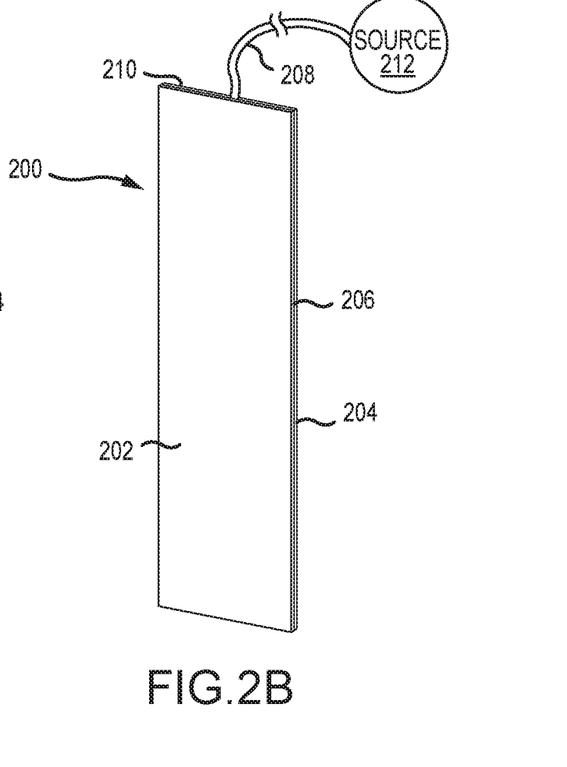

Referring now to FIGS. 2A, 2B, 2C and 2D, a series of SPF or VSPF steps used to deform a pair of metal blanks into a pair of forward bulkhead segments is illustrated, in accordance with various embodiments. Referring to FIG. 2A, a pair of metal blanks 200 is illustrated. In various embodiments, the pair of metal blanks 200 includes a first metal blank 202 and a second metal blank 204. In various embodiments, the first metal blank 202 and the second metal blank 204 each comprise a sheet of metal capable of superplastic deformation, such as, for example, titanium alloy. Referring now to FIG. 2B, the first metal blank 202 and the second metal blank 204 are positioned adjacent one another. An outer periphery 206 of both the first metal blank 202 and the second metal blank 204, extending about the four-sided periphery of each blank, is welded to seal the two blanks together. In various embodiments, a tube 208 is welded to a top portion 210 or some other portion of the outer periphery 206. The welding of the tube 208 to, for example, the top portion 210 is configured to enable a pressurized gas to be injected into an interior space between the pair of metal blanks 200 following their being welded together about the outer periphery 206. In various embodiments, the tube 208 is connected to a source 212 of gas. In various embodiments, the source 212 is configured to inject an inert gas, such as argon, into the interior space between the pair of metal blanks 200. In various embodiments, the source 212 is a pressurized storage container, such as, for example, a bulk storage tank or bottle or the like.

Figure 2C:
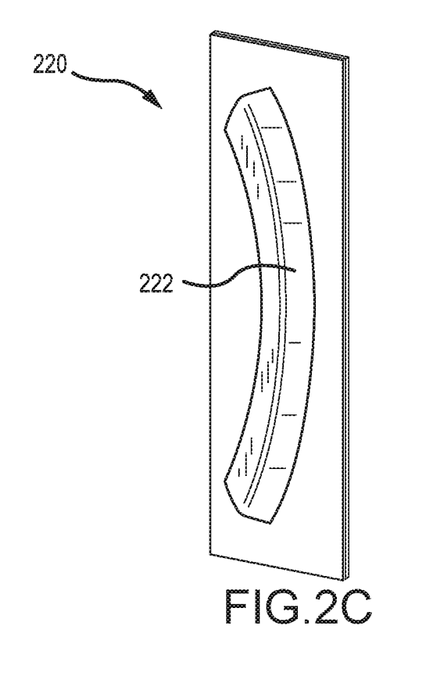
Figure 2D:
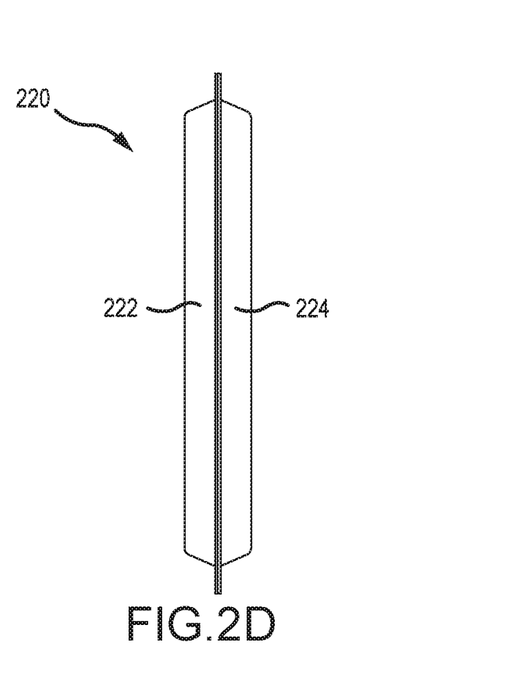
Figure 4A:
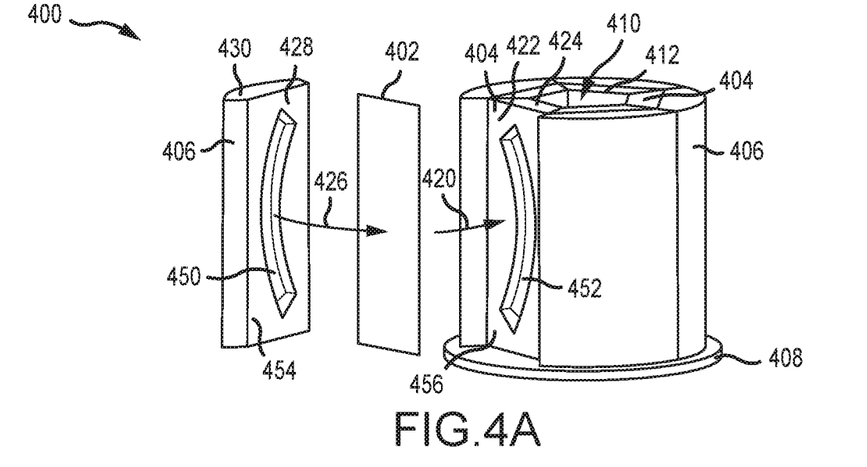
FIGS. 4A, 4B and 4C illustrate a die assembly and a series of steps used to deform pairs of metal blanks using the die assembly, in accordance with various embodiments.

Referring now to FIGS. 2C and 2D, the pair of metal blanks 200 is illustrated as a pair of deformed metal blanks 220, following its undergoing a SPF or VSPF process within a pair of dies having the shape of a forward bulkhead segment (see, e.g., FIG. 4A). As will be described more fully below, the pair of metal blanks 200, following being welded together on the outer periphery 206 and having the tube 208 attached, is placed between the pair of dies, each die having a cavity with a contour in the shape of an outer surface of a forward bulkhead segment (see, e.g., FIG. 4A). The die set is heated to a temperature sufficient to cause the material comprising the pair of metal blanks 200 to achieve a superplastic state. Compressed gas is then introduced into the interior space between the pair of metal blanks 200, thereby pressurizing the interior space and causing metal to be urged, superplastically, into the cavity of each of the pair of dies. The pair of deformed metal blanks 220 results, having a first deformed portion 222 and a second deformed portion 224, each deformed portion having the shape of a forward bulkhead segment. In various embodiments, a VSPF process is employed to cause the deformation described above, requiring a space surrounding the pair of metal blanks 200 or both the pair of metal blanks 200 and the pair of dies be brought to vacuum conditions. Superplastic deformation (or deformation occurring in a state of superplasticity) refers, herein, to states in which fine-grained crystalline materials, such as titanium alloys, are capable of deforming substantially beyond the typical breaking points that occur at temperatures below the onset of superplasticity. For example, superplastically deformed materials tend to thin uniformly under tensile loads rather than forming a "neck" and fracturing.

Figure 3A:
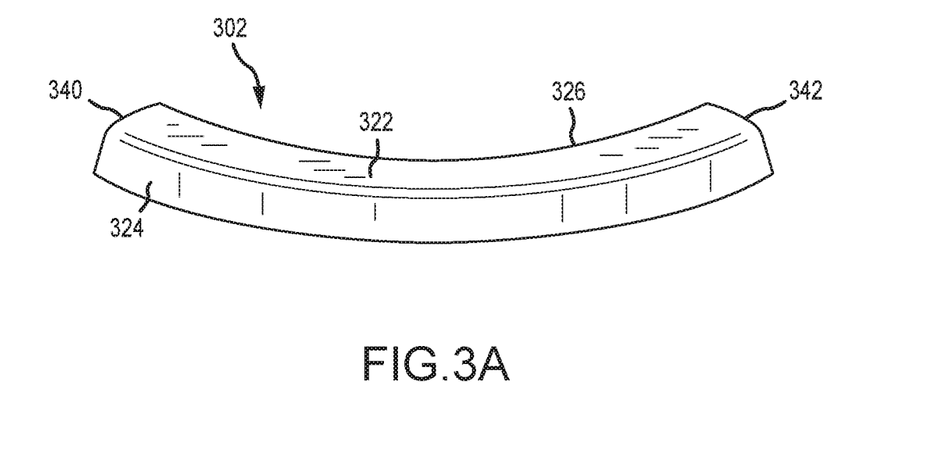
FIGS. 3A and 3B illustrate perspective views of a pair of forward bulkhead segments, in accordance with various embodiments.
Figure 3B:
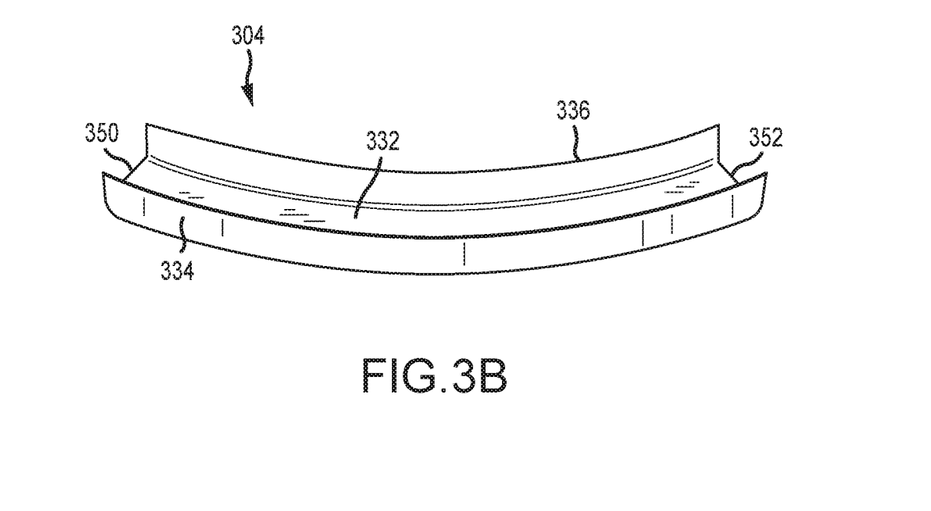

Referring now to FIGS. 3A and 3B, perspective views of a first forward bulkhead segment 302 and a second forward bulkhead segment 304 are illustrated. In various embodiments, the first forward bulkhead segment 302 is the first deformed portion 222 and the second forward bulkhead segment 304 is the second deformed portion 224, described above with reference to FIGS. 2C and 2D. In various embodiments, the first forward bulkhead segment 302 and the second forward bulkhead segment 304 are obtained from the pair of deformed metal blanks 220, above described, by cutting away the undeformed material surrounding the first deformed portion 222 and the second deformed portion 224. The first forward bulkhead segment 302 that results includes a central member 322, an outer side member 324 and an inner side member 326, similar to the central member 122, the outer side member 124 and the inner side member 126 described above with reference to FIG. 1B. Similarly, the second forward bulkhead segment 304 includes a central member 332, an outer side member 334 and an inner side member 336, similar to the central member 122, the outer side member 124 and the inner side member 126 described above with reference to FIG. 1B. In various embodiments, the first forward bulkhead segment 302 includes a first end 340 and a second end 342 and, similarly, the second forward bulkhead segment 304 includes a first end 350 and a second end 352. Each of the ends is formed by removing the end portions that otherwise connect the central, inner side and outer side members following the deformation process. In various embodiments, the ends of adjacently positioned forward bulkhead segments are ultimately joined or assembled within the interior of the noselip using a joggle or similar joining technique.

Figure 4B:
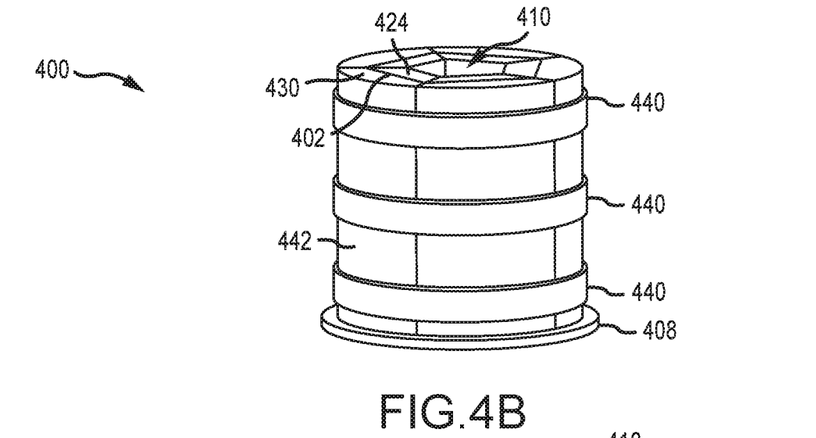
Figure 4C:
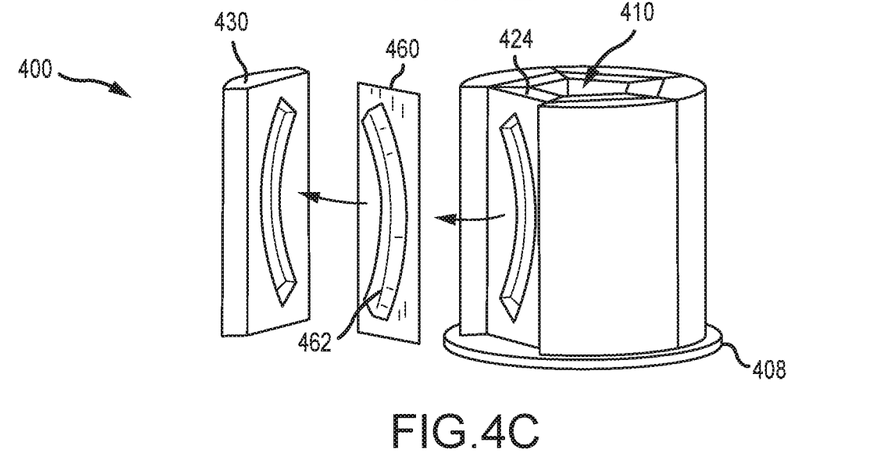

Referring now to FIGS. 4A, 4B and 4C, a die assembly 400 and a series of steps used to deform pairs of metal blanks, such as the pair of metal blanks 402, using the die assembly 400 are illustrated, in accordance with various embodiments. In various embodiments, the die assembly 400 includes a plurality of inner radial dies 404 and a plurality of outer radial dies 406. In various embodiments, the plurality of inner radial dies 404 and the plurality of outer radial dies 406 are arranged in a pentagonal or circular fashion and are positioned on a base plate 408. In various embodiments, both the plurality of inner radial dies 404 and the plurality of outer radial dies 406 are equal to five (5) in number, and each one of the plurality of inner radial dies 404 has a cross sectional shape in the form of a trapezoid, such that when assembled, the die assembly 400 includes a hollow interior 410 or lengthwise void having a pentagonal-shaped surface 412. In various embodiments, both the plurality of inner radial dies 404 and the plurality of outer radial dies 406 equal N in number, and each one of the plurality of inner radial dies 404 has a cross sectional shape in the form of a trapezoid, such that when assembled, the die assembly 400 includes a hollow interior having a surface with cross section in the form of an N-polygon. In various embodiments, the die assembly 400 includes a hollow interior or lengthwise void having a surface with cross section in the form of a circle. In various embodiments, the hollow interior or lengthwise void of the die assembly 400 facilitates more effective heating of the system and less overall weight compared to a system without a hollow interior. In various embodiments, each of the plurality of inner radial dies 404 and each of the plurality of outer radial dies 406 is constructed of a graphite material. In various embodiments, the base plate 408 is constructed of a graphite material.

Still referring to FIGS. 4A, 4B and 4C, the series of steps used to deform pairs of metal blanks, such as the pair of metal blanks 402, using the die assembly 400 is described. A first step includes preparation of the pair of metal blanks 402. In various embodiments, the preparation is accomplished as described above with reference to FIGS. 2A and 2B. In various embodiments, five (5) pairs of metal blanks are prepared, one pair of metal blanks for each of the five pairs of inner and outer radial dies. A second step 420 includes placing the pair of metal blanks 402 adjacent an outer wall 422 of a first inner die 424. A third step 426 includes placing an inner wall 428 of a first outer die 430 adjacent the still exposed surface of the pair of metal blanks 402, such that the pair of metal blanks 402 becomes sandwiched between the outer wall 422 of the first inner die 424 and the inner wall 428 of the first outer die 430. In various embodiments, the steps are repeated until each of the five (5) pairs of metal blanks is sandwiched between corresponding inner and outer walls of respective outer and inner dies. An additional step contemplates connection of tubes from each of the pairs of metal blanks to one or more sources of gas—e.g., connecting the tube 208 to the source 212 described above with reference to FIG. 2B—in order to pressurize the interiors of each of the pairs of metal blanks.

Referring now to FIG. 4B, following assemblage of the die assembly 400 as described above, one or more structural rings 440 are positioned about an outer surface 442 of the die assembly 400. In various embodiments, the one or more structural rings 440 may comprise a cylindrical sleeve extending from the base plate 408 to the top of the die assembly 400. In various embodiments, the one or more structural rings 440 or cylindrical sleeve is constructed using a material having a low coefficient of thermal expansion. In various embodiments, the material may comprise graphite or a carbon-carbon material, such as, for example, carbon fiber and graphite. In various embodiments, the one or more structural rings 440 or cylindrical sleeve serve to maintain the die assembly 400 in its assembled configuration upon heating, which causes thermal expansion and upon pressurization of the interiors of the pairs of metal blanks, both of which will have a tendency to urge the outer radial dies in a radially outward direction. Following installation of the one or more structural rings 440 or sleeve, the die assembly 400, including the rings or cylindrical sleeve and base plate 408 are positioned within a furnace. In various embodiments, a VSPF process is employed to cause the deformation described above, requiring the space within the furnace surrounding the die assembly 400 in its assembled configuration to be evacuated and brought to vacuum conditions. The furnace then raises the temperature of the die assembly 400 and each of the pairs of metal blanks to a temperature sufficient to achieve a superplastic state. Compressed gas is then introduced into the interior space between each of the pairs of metal blanks causing metal to be urged, superplastically, into the cavities of each of the pair of dies—e.g., a radially inward facing cavity 450 in a radially inward facing wall 454 of the first outer die 430 and a radially outward facing cavity 452 in a radially outward facing wall 456 of the first inner die 424—similar to the process described above with reference to FIG. 2C.

Referring now to FIG. 4C, following superplastic deformation of each of the pairs of metal blanks, the die assembly 400 is allowed to cool. The first outer die 430 is then removed from the die assembly 400, followed by removal of a first pair of deformed metal blanks 460. The first pair of deformed metal blanks 460 includes a first deformed portion 462 and a second deformed portion opposite the first deformed portion 462, each deformed portion having the shape of a forward bulkhead segment. Each of the remaining outer dies is removed, followed by removal of each of the resulting pairs of deformed metal blanks. Similar to the discussion above with reference to FIGS. 3A and 3B, the undeformed material is removed from the deformed portions in each of the five (5) pairs of deformed metal blanks, resulting in ten (10) forward bulkhead segments.

In various embodiments, a complete forward bulkhead, such as a forward bulkhead extending completely about the noselip 116, described above with reference to FIG. 1A, comprises five (5) forward bulkhead segments. Thus, this disclosure and the configuration and embodiments described above and below contemplate the fabrication of at least two (2) complete ship sets of forward bulkhead segments—e.g., one ship set for each of two engines—during each fabrication process, such as the fabrication process described above with reference to FIGS. 4A, 4B and 4C. In various embodiments, fewer or greater numbers than five (5) bulkhead segments may be required to form a complete ship set, depending on the specific engine or aircraft under consideration. In such cases, die assemblies having fewer or greater numbers of sections are contemplated consistent with this disclosure—e.g., fewer or greater than the five (5) sections used in the die assembly 400 described above.

Figure 5A:
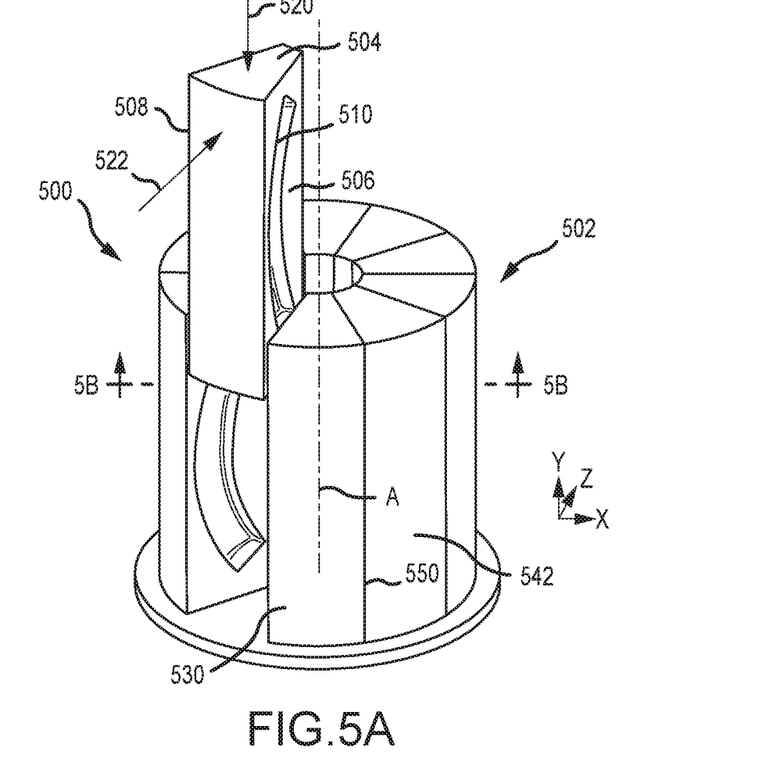
FIGS. 5A and 5B illustrate a die assembly used to deform pairs of metal blanks, in accordance with various embodiments.
Figure 5B:
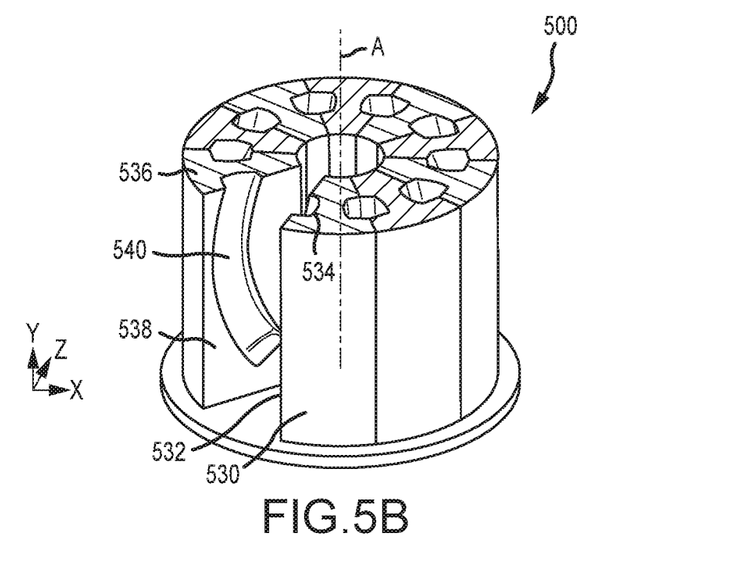

Referring now to FIGS. 5A and 5B, a die assembly 500 used to deform pairs of metal blanks is illustrated, in accordance with various embodiments. In various embodiments, the die assembly 500 includes a plurality of radial dies 502, including a first radial die 504. One or more of the radial dies include cavities on circumferentially facing walls of the radial dies. For example, the first radial die 504 includes a first circumferentially facing wall 506 and a second circumferentially facing wall 508. The first circumferentially facing wall 506 includes a first circumferentially facing cavity 510 and the second circumferentially facing wall 508 includes a second circumferentially facing cavity. A second radial die 530 includes a circumferentially facing wall 532 and a circumferentially facing cavity 534 extending into the die through the circumferentially facing wall 532. A third radial die 536 includes a circumferentially facing wall 538 and a circumferentially facing cavity 540 extending into the die through the circumferentially facing wall 538. The plurality of radial dies 502 is distributed in circumferential fashion (or in a circular pattern) about a base plate, with circumferentially facing walls of adjacently positioned radial dies facing one another.

In various embodiments, a series of steps used to deform pairs of metal blanks, similar to the steps above described, is employed. For example, a first step includes preparation of pairs of metal blanks. In various embodiments, the preparation is accomplished as described above with reference to FIGS. 2A and 2B. In various embodiments, ten (10) pairs of metal blanks are prepared, one pair of metal blanks for sandwiching between pairs of the ten radial dies illustrated in FIGS. 5A and 5B. A second step includes placing the pairs of metal blanks between the circumferentially facing walls of adjacently positioned radial dies. For example, a first pair of metal blanks 550 is illustrated positioned between the second radial die 530 and a fourth radial die 542. In various embodiments, the radial dies, such as the first radial die 504 may be placed into position by lowering the die in an axial direction 520 or by translating the die toward an axial centerline A in a radial direction 522. An additional step contemplates connection of tubes from each of the pairs of metal blanks to one or more sources of gas—e.g., connecting the tube 208 to the source 212 described above with reference to FIG. 2B—in order to pressurize the interiors of each of the pairs of metal blanks.

As described above, one or more structural rings or a cylindrical sleeve, similar to the one or more structural rings 440 and cylindrical sleeve described above with reference to FIG. 4B, is positioned about an outer surface of the die assembly 500. Following installation of the one or more structural rings or cylindrical sleeve, the die assembly 500, including the rings or sleeve and the base are positioned within a furnace. In various embodiments, a VSPF process is employed to cause the deformation described above, requiring the space within the furnace surrounding the die assembly 500 in its assembled configuration to be evacuated and brought to vacuum conditions. The furnace then raises the temperature of the die assembly and each of the pairs of metal blanks to a temperature sufficient to achieve a superplastic state. Compressed gas is then introduced into the interior space between each of the pairs of metal blanks causing metal to be urged, superplastically, into the cavities of each of the pair of dies, similar to the process described with reference to FIG. 2C.

Following superplastic deformation of each of the pairs of metal blanks, the die assembly 500 is allowed to cool and then disassembled. In various embodiments, one or more adjacently positioned radial dies may utilize dummy blanks positioned between pairs of opposing circumferentially facing walls to aid in disassembly of the die assembly 500—e.g., to prevent the assembly from locking itself together following deformation of the metal blanks into the circumferentially facing cavities. In various embodiments, a dummy blank may comprise one of the pairs of metal blanks that is not pressurized during the superplastic forming process. The embodiments illustrated in FIGS. 5A and 5B are capable of producing up to twenty (20) forward bulkhead segments during each superplastic forming process. In various embodiments, fewer or greater numbers of radial dies may be employed than the ten (10) radial dies illustrated in FIGS. 5A and 5B.

Figure 6A:
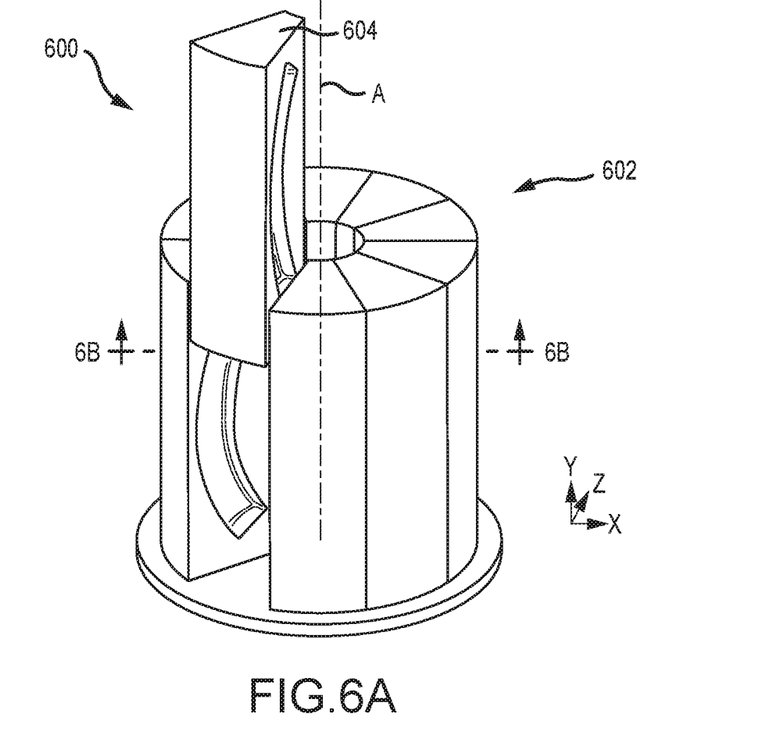
FIGS. 6A and 6B illustrate a die assembly used to deform pairs of metal blanks, in accordance with various embodiments.
Figure 6B:
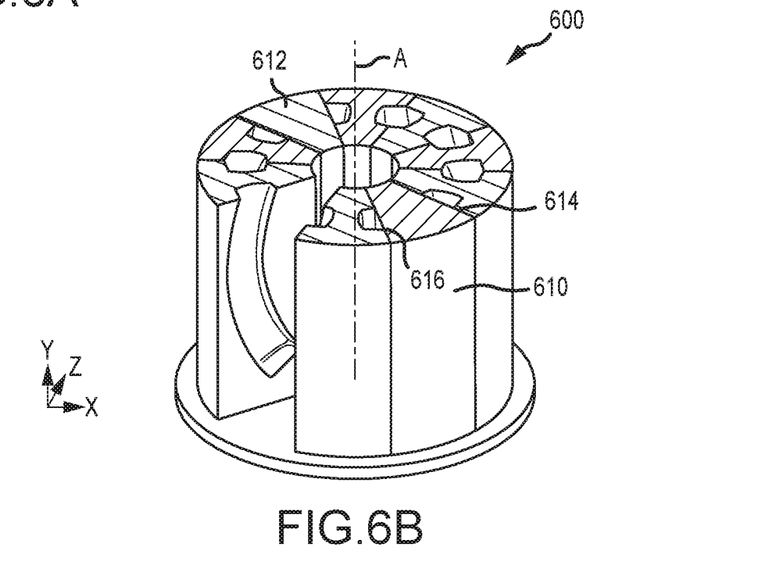

Referring now to FIGS. 6A and 6B, a die assembly 600 used to deform pairs of metal blanks is illustrated. In various embodiments, the die assembly 600 includes a plurality of radial dies 602, including a first radial die 604. The die assembly 600 shares many similarities in construction, assembly, operation and disassembly with the die assembly 500, described above with reference to FIGS. 5A and 5B, and those similarities are not repeated here. Similar to the embodiments above described, one or more structural rings or a cylindrical sleeve, such as the structural rings 440 and cylindrical sleeve described above with reference to FIG. 4B, is positioned about an outer surface of the die assembly 600 prior to heating. One dissimilarity is, however, the die assembly 600 includes one or more radial dies that do not include circumferentially facing cavities extending into the radial die through its corresponding circumferentially facing walls. For example, referring to FIG. 6B, a second radial die 610 is positioned radially opposite a third radial die 612. The second radial die 610 includes a first circumferentially facing wall 614 and a second circumferentially facing wall 616. As illustrated, both the first circumferentially facing wall 614 and the second circumferentially facing wall 616 are flat and include no cavity. The same feature applies to the circumferentially facing walls on the third radial die 612. Employing one or more radial dies with one or both of the circumferentially facing walls being flat facilitates tailoring the number of forward bulkhead segments that are produced during each superplastic forming process. For example, the number of forward bulkhead segments produced using the die assembly 600 illustrated in FIGS. 6A and 6B is fifteen (15), providing three (3) complete ship sets of five (5) forward bulkhead segments per ship set. Employing one or more radial dies with one or both of the circumferentially facing walls being flat may also facilitate disassembly of the die assembly following the superplastic forming process.

The foregoing discloses various methods and apparatus for simultaneously forming multiple components for gas turbine engines and, more particularly, for nacelles of gas turbine engines. While the description focuses on forward bulkhead structures for nacelles, the disclosure contemplates other components, such as aft bulkhead structures, noselip structures and the like, particularly where such structures are comprised of multiple segments. Further, the disclosure contemplates structures comprising multiple segments that are not precisely the same shape, such as occurs for nacelle geometries that are not substantially circular when viewed along a central axis of a gas turbine engine housed within a nacelle. Such non-circular nacelle structures may be found, for example, with engines mounted under an aircraft wing on pylons, where a portion of the nacelle structure toward the ground may be flattened somewhat to provide sufficient space between the lower portion of the engine and the ground.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An assembly for forming multiple nacelle components, comprising:
   a plurality of dies arranged about a central axis,
      a first one of the plurality of dies having a first wall and a first cavity extending through the first wall and
      a second one of the plurality of dies having a second wall and a second cavity extending through the second wall,
      wherein the first wall and the second wall are configured to sandwich a pair of metal blanks there between,
      wherein the first one of the plurality of dies is a radially outer die configured for arrangement within an outer circular pattern and wherein the first wall is a radially inward facing wall and
      wherein the second one of the plurality of dies is a radially inner die configured for arrangement within an inner circular pattern and wherein the second wall is a radially outward facing wall.

2. The assembly of claim 1, wherein the plurality of dies comprises a plurality of radially outer dies, including the first one of the plurality of dies, configured for arrangement within the outer circular pattern.

3. The assembly of claim 2, wherein the plurality of dies comprises a plurality of radially inner dies, including the second one of the plurality of dies, configured for arrangement within the inner circular pattern.

4. The assembly of claim 3, wherein each of the plurality of radially inner dies includes a radially inner surface configured to define a lengthwise void along the central axis.

5. The assembly of claim 4, wherein each of the plurality of radially outer dies includes a radially outer surface configured to receive a structural ring to surround the plurality of dies.

6. The assembly of claim 5, wherein the structural ring is a cylindrical sleeve.

7. The assembly of claim 1, wherein the first cavity is a radially inward facing cavity and the second cavity is a radially outward facing cavity.

8. The assembly of claim 1, further comprising a base member and a cylindrical sleeve configured to extend from the base member to an upper portion of the assembly.

9. An assembly for forming multiple forward bulkhead segments, comprising:
 a plurality of dies arranged about a central axis,
  a first one of the plurality of dies having a first wall and a first cavity shaped as a first forward bulkhead segment extending through the first wall and
  a second one of the plurality of dies having a second wall and a second cavity shaped as a second forward bulkhead segment extending through the second wall,
  wherein the first wall and the second wall are configured to sandwich a pair of metal blanks there between,
  wherein the first one of the plurality of dies is a first radial die configured for arrangement within a circular pattern and wherein the first wall is a first circumferentially facing wall and
  wherein the second one of the plurality of dies is a second radial die configured for arrangement within the circular pattern and wherein the second wall is a second circumferentially facing wall.

10. The assembly of claim 9, wherein the first cavity is a first circumferentially facing cavity within the first circumferentially facing wall, and wherein the second cavity is a second circumferentially facing cavity within the second circumferentially facing wall.

11. The assembly of claim 9, further comprising a base member and a structural ring configured to surround the plurality of dies and extend from the base member to an upper portion of the assembly.

* * * * *